(12) United States Patent
Kelly et al.

(10) Patent No.: US 11,091,145 B2
(45) Date of Patent: Aug. 17, 2021

(54) METHOD AND SYSTEM FOR ENGINE CONTROL

(71) Applicant: Ford Global Technologies, LLC, Dearborn, MI (US)

(72) Inventors: Tyler Kelly, Plymouth, MI (US); Douglas Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 497 days.

(21) Appl. No.: 15/968,621

(22) Filed: May 1, 2018

(65) Prior Publication Data

US 2019/0337504 A1    Nov. 7, 2019

(51) Int. Cl.
*B60W 20/14* (2016.01)
*B60W 10/08* (2006.01)
*B60W 10/24* (2006.01)
*B60W 10/30* (2006.01)
*B60W 30/18* (2012.01)
*B60W 10/06* (2006.01)
*B60W 10/02* (2006.01)

(52) U.S. Cl.
CPC ............ *B60W 20/14* (2016.01); *B60W 10/02* (2013.01); *B60W 10/06* (2013.01); *B60W 10/08* (2013.01); *B60W 10/24* (2013.01); *B60W 10/30* (2013.01); *B60W 30/18127* (2013.01); *B60W 30/18136* (2013.01); *B60W 2510/244* (2013.01); *B60W 2520/105* (2013.01); *B60W 2710/02* (2013.01); *B60W 2710/0605* (2013.01); *B60W 2710/0638* (2013.01); *B60W 2710/083* (2013.01); *B60W 2710/24* (2013.01); *B60W 2710/30* (2013.01); *Y10S 903/904* (2013.01); *Y10S 903/93* (2013.01)

(58) Field of Classification Search
CPC ................. B60W 20/13; B60W 20/14; B60W 30/18127; F02B 39/10
See application file for complete search history.

(56) References Cited

U.S. PATENT DOCUMENTS

| | | |
|---|---|---|
| 2,358,681 A | 9/1944 | Beetem |
| 2,402,695 A | 6/1946 | Taylor et al. |
| 4,290,268 A | 9/1981 | Lowther |
| 4,798,053 A | 1/1989 | Chang |
| 5,939,865 A | 8/1999 | McGrath et al. |
| 6,552,439 B2 | 4/2003 | Dunsworth et al. |

(Continued)

FOREIGN PATENT DOCUMENTS

JP    2017136974 A  *  8/2017

OTHER PUBLICATIONS

McConville, G. et al., "System and Method for Boost Control," U.S. Appl. No. 15/878,865, filed Jan. 24, 2018, 66 pages.

(Continued)

*Primary Examiner* — Katy M Ebner
(74) *Attorney, Agent, or Firm* — Geoffrey Brumbaugh; McCoy Russell LLP

(57) ABSTRACT

Methods and systems are provided for enabling vehicle speed control without overfilling a system battery. In one example, braking energy is applied (or recuperated) by applying a negative torque from BISG until a system battery has been sufficiently charged. Thereafter, the electrical power generated by the BISG is used to operate an electric boost assist motor, and the energy is recuperated in the form of stored compressed air.

19 Claims, 4 Drawing Sheets

(56) References Cited

U.S. PATENT DOCUMENTS

| | | | |
|---|---|---|---|
| 7,471,066 B2 | 12/2008 | Ambrosio et al. | |
| 9,102,325 B2* | 8/2015 | Jung | F02N 11/003 |
| 9,677,486 B2* | 6/2017 | Kees | F02D 41/0087 |
| 9,695,740 B2* | 7/2017 | Xiao | F02B 37/14 |
| 10,513,973 B2* | 12/2019 | Kelly | F02D 41/40 |
| 10,744,892 B2* | 8/2020 | Bell | B60K 6/44 |
| 10,800,415 B2* | 10/2020 | Hu | F02B 37/24 |
| 2010/0314186 A1* | 12/2010 | Ma | F02B 29/00 180/165 |
| 2012/0329603 A1* | 12/2012 | Yamazaki | B60W 20/10 477/3 |
| 2014/0100729 A1* | 4/2014 | Jung | F02N 11/04 701/22 |
| 2015/0051762 A1* | 2/2015 | Banker | B60W 10/08 701/22 |
| 2016/0099591 A1 | 4/2016 | Lee et al. | |
| 2019/0337504 A1* | 11/2019 | Kelly | B60W 30/18127 |
| 2020/0148210 A1* | 5/2020 | Naserian | B60W 20/14 |
| 2020/0240330 A1* | 7/2020 | Christensen | F04D 29/4213 |
| 2020/0262413 A1* | 8/2020 | Song | F02B 37/04 |
| 2020/0298857 A1* | 9/2020 | Yonezawa | B60L 7/26 |

OTHER PUBLICATIONS

Kelly, T., "Method and System for Engine Control," U.S. Appl. No. 15/968,636, filed May 1, 2018, 50 pages.

* cited by examiner

METHOD AND SYSTEM FOR ENGINE CONTROL

FIELD

The present description relates generally to methods and systems for controlling output of an electrically assisted boosting device to control vehicle speed without over-filling of a system battery.

BACKGROUND/SUMMARY

Engine systems may include boosting devices for boosting the torque and peak power output by an internal combustion engine. By compressing the intake air, the boosting device increases the mass airflow into the engine, which in turn permits a greater amount of fuel to be combusted on each ignition event. One example of a boosting device is a turbocharger wherein a compressor positioned in an intake passage of the engine is mechanically coupled to an exhaust turbine via a shaft. The turbine is spun using exhaust energy which in turn drives the compressor.

Turbochargers may also be configured with electric assistance wherein a motor/generator is coupled to the shaft (herein also referred to as an eTurbo). The eTurbo typically runs on an existing 48V mHEV architecture of the engine with a 48V belt integrated starter generator (BISG), a 48V battery, and a 48V/12V DC-DC converter. The electric assistance can provide improved transient engine response by motoring the turbocharger shaft during conditions when the turbine speed is low (due to low exhaust flow), thereby reducing turbo lag. During a vehicle deceleration event, the motor, acting as a generator, can also be used for vehicle speed control.

One example approach for vehicle speed control is shown by Kees et al. in U.S. Pat. No. 9,677,486. Therein, cylinder deactivation and regenerative braking (via a driveline BISG) are used in combination to recuperate energy from a vehicle deceleration event. In still other examples, regenerative braking via the motor coupled to the shaft of an eTurbo is used to reduce the vehicle speed. The braking energy is recuperated by operating the eTurbo motor as a generator and the recuperated energy is stored in an energy storage device coupled to the motor, such as in a battery.

However, the inventors herein have recognized potential issues with such systems. As one example, the amount of regenerative braking that can be used to reduce vehicle speeds may itself be limited. In particular, if the storage device (e.g., a Li ion battery) coupled to the eTurbo motor is already at a higher than threshold state of charge (e.g., fully charged), it may not be able to accept further electrical energy. As such, overfilling can damage the battery. If the waste-gate is opened to rapidly reduce the turbine speed, and thereby reduce engine output and vehicle speed, the boost energy is dumped or wasted and cannot be harvested. If the battery is already full when the vehicle enters a deceleration event, a vehicle controller may have to revert to using friction brakes which are costly and prone to wear and tear.

In one example, the issues described above may be addressed by a method for a boosted engine, comprising: responsive to vehicle deceleration requested while a system battery is at a higher than threshold state of charge, applying negative torque from a belt-integrated starter generator (BISG) on a vehicle driveline while concurrently applying positive torque from an electric motor onto a turbocharger shaft. For example, responsive to an operator braking request, the method may include applying negative torque from an electric motor coupled to a turbocharger shaft to charge a battery until a threshold SOC is reached; and then, commanding a BISG to apply negative torque on the driveline to decelerate the vehicle. Concurrently, the regenerative braking energy generated by the BISG may be used to drive the electric motor of the electric turbocharger to generate compressed air while opening an air storage valve coupled downstream of the turbocharger compressor to direct a portion of the compressed air into an air storage device. In this way, the braking energy is stored as compressed air. This allows the boost pressure in the intake manifold to be controlled, while enabling the compressed air to be stored for later use (such as for operating pneumatic devices on-board the vehicle or for reducing turbo lag during a subsequent increase in driver torque demand). In this way, vehicle speed control can be provided without overfilling a system battery and while harnessing a larger portion of the braking energy.

As one example, an engine system may be configured with an electric turbocharger having an electric motor coupled to a turbocharger shaft. During a vehicle deceleration event (such as when an operator has requested vehicle braking), negative torque may be applied by the electric motor to slow the vehicle or turbine. The negative torque may be used to charge a system battery, specifically, a 48V system battery coupled to the vehicle's driveline. Charging may be continued until the battery is at a threshold state of charge (SOC), such as at 95% SOC. Above this level, further charging of the battery can cause overfilling of the battery, which can degrade the battery's performance. Once the battery has reached the threshold SOC, a contactor coupling the battery to a 48V line of the vehicle's electrical system can be opened, thereby disabling further charging of the battery by the e-turbo motor. Thereafter, a transmission clutch may be engaged and negative torque may be applied via a BISG coupled to the driveline. The torque applied by the BISG may be based on the additional braking required for vehicle speed control (after absorbing torque to charge the battery). The torque absorbed at the BISG may then be used to operate the e-turbo motor. For example, the braking (negative) torque applied by the BISG may be used to generate electrical energy that is shared with a 48V distribution box of the vehicle's 48V electrical architecture. Electrical energy is then drawn from the 48V distribution box to operate the electric motor of the turbocharger at an output based on the power generated by BISG. Operation of the electric motor results in a higher than requested boost pressure to be generated at an outlet of the compressor. The opening of an air storage valve coupled downstream of the turbocharger compressor may be adjusted so as to divert at least a portion of the compressed air into an air storage tank, thereby maintaining a target manifold pressure. The compressed air stored in the air storage tank can be used (concurrently or at a later time) for various functions, such as to operate one or more pneumatic devices of the vehicle. In addition, the compressed air may be directed through a pipe to create vacuum which can be used to operate various vacuum-actuated devices. Alternatively, the compressed air may be used at a later tip-in event to reduce turbo lag.

In this way, by proportioning an amount of negative torque required for vehicle speed control between an electric motor of an electric turbocharger and a BISG, overfilling of a charge sensitive system battery, such as a 48V battery of a hybrid vehicle's driveline, can be reduced. The technical effect of absorbing torque at a BISG is that braking energy may be recuperated through the vehicle's driveline, instead of through the battery. This allows any excess torque generated after the system battery is charged till a threshold SOC to be used to drive the electric motor of the turbocharger, instead of being wasted. By using the BISG to generate electrical energy, and then by using the electrical energy to fill a compressed air storage tank, the energy is better harvested, and dumping of boost pressure via opening of an exhaust waste-gate is reduced. By filling a compressed air storage tank via the compressor while absorbing torque at the BISG, vehicle speed can be controlled while advantageously generating compressed air or vacuum for use on-board the vehicle. By harnessing the braking energy as compressed air, and then using the compressed air to raise boost pressure during an increase in torque demand, turbo lag can be reduced without needing to operate the electric motor of the turbocharger, thereby providing a further improvement in fuel economy. In addition, manifold pressure and engine output may be maintained while the braking energy is recuperated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
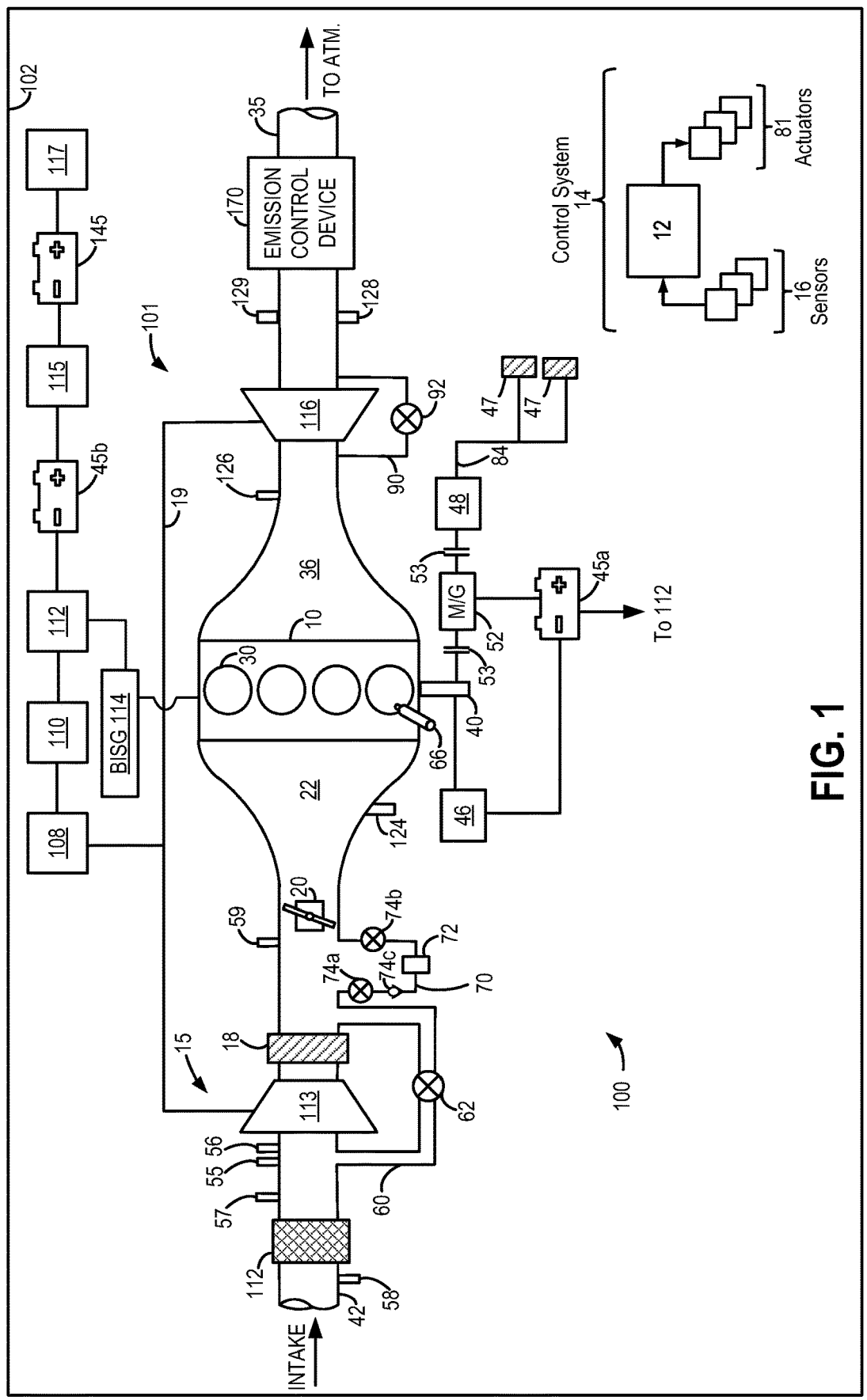
FIG. 1 shows a schematic depiction of a boosted engine system configured with electric boost assist.

The following description relates to systems and methods for speed control in a boosted engine system configured with electric assist, such as the engine system of FIG. 1. The system may leverage electrical connections between an electric assist motor of a turbocharger, a BISG, and a 48V electrical system, such as the system of FIG. 2. An engine controller may be configured to perform a control routine, such as the example routine of FIG. 3 to address vehicle over-speeding by proportioning regenerative brake torque between an electric boost assist motor and a BISG, the proportioning based on a state of charge of a system battery. The controller may use the brake torque recuperated via the BISG to operate the electric boost assist motor and store the recuperated energy as compressed air in a storage tank for later use. Example adjustments are shown with reference to FIG. 4.

FIG. 1 schematically shows aspects of an example vehicle system 100, including an engine system 101 having an engine 10 coupled in a vehicle 102. In the depicted example, vehicle 102 is a hybrid electric vehicle with multiple sources of torque available to one or more vehicle wheels 47. However in alternate examples, vehicle system 100 may include a conventional non-hybrid powertrain. In the example shown, a powertrain of vehicle 102 includes engine 10 and an electric machine 52. Electric machine 52 may be a motor or a motor/generator. Engine 10 and electric machine 52 are connected to vehicle wheels 47 via a transmission 48 when one or more clutches 53 are engaged. In the depicted example, a (first) clutch 53 is provided between engine 10 and electric machine 52, and a (second) clutch 53 is provided between electric machine 52 and transmission 48. A controller 12 may send a signal to an actuator of each clutch 53 to engage or disengage the clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 47 via a crankshaft 40, transmission 48, and a powertrain shaft 84 when clutches 53 are engaged. Transmission 48 may be a gearbox, a planetary gear system, or another type of transmission. Transmission 48 may be a fixed ratio transmission that includes a plurality of gear ratios to allow engine 10 to rotate at a different speed than wheels 47. By changing a torque transfer capacity of first clutch 53 (e.g., an amount of clutch slippage), an amount of engine torque relayed to the wheels via powertrain shaft 84 (herein also referred to as the driveline) may be modulated.

In the depicted example, electric machine 52 is an electric motor coupled in the drivetrain between the engine and the transmission. However, additional electric machines may be coupled to crankshaft 40. For example, a belt integrated starter/generator (BISG) 114 may also be coupled to an output shaft of the engine so that during a startup of the hybrid vehicle system, the BISG may provide torque to turn the engine to facilitate startup of the engine. Under some conditions, the BISG may also supply torque output to supplement or replace engine torque. Further, the BISG may supply negative torque output (that is, absorb driveline torque) that may be converted into electric energy, such as for charging a system battery. Further still, as elaborated herein, under some conditions, the BISG may absorb torque from the driveline to enable vehicle speed control while driving an electric motor, and storing the braking energy in the form of compressed air. By enabling vehicle speed control via BISG negative torque application, friction brake application is reduced. Since the BISG is coupled to the driveline wheels via the transmission, recuperating the wheel braking energy via the BISG may include actuating a transmission clutch.

The powertrain may be configured in various manners, including as a parallel, a series, or a series-parallel hybrid vehicle. In electric vehicle embodiments, a system electrical energy device, such as system battery 45a may be coupled to the driveline. System battery 45a may be a traction battery, for example a 48V battery that delivers electrical power to electric machine 52 to provide torque to vehicle wheels 47. In some embodiments, electric machine 52 may also be operated as a generator to provide electrical power to charge system battery 45a, for example, during a braking operation using regenerative torque. It will be appreciated that in other embodiments, including non-electric vehicle embodiments, system battery 45a may be a typical starting, lighting, ignition (SLI) battery coupled to an alternator 46.

It will be appreciated that while the system electrical energy storage device 45a is depicted herein as a battery, in other examples, the electrical energy storage device 45a may be a capacitor.

Figure 2:
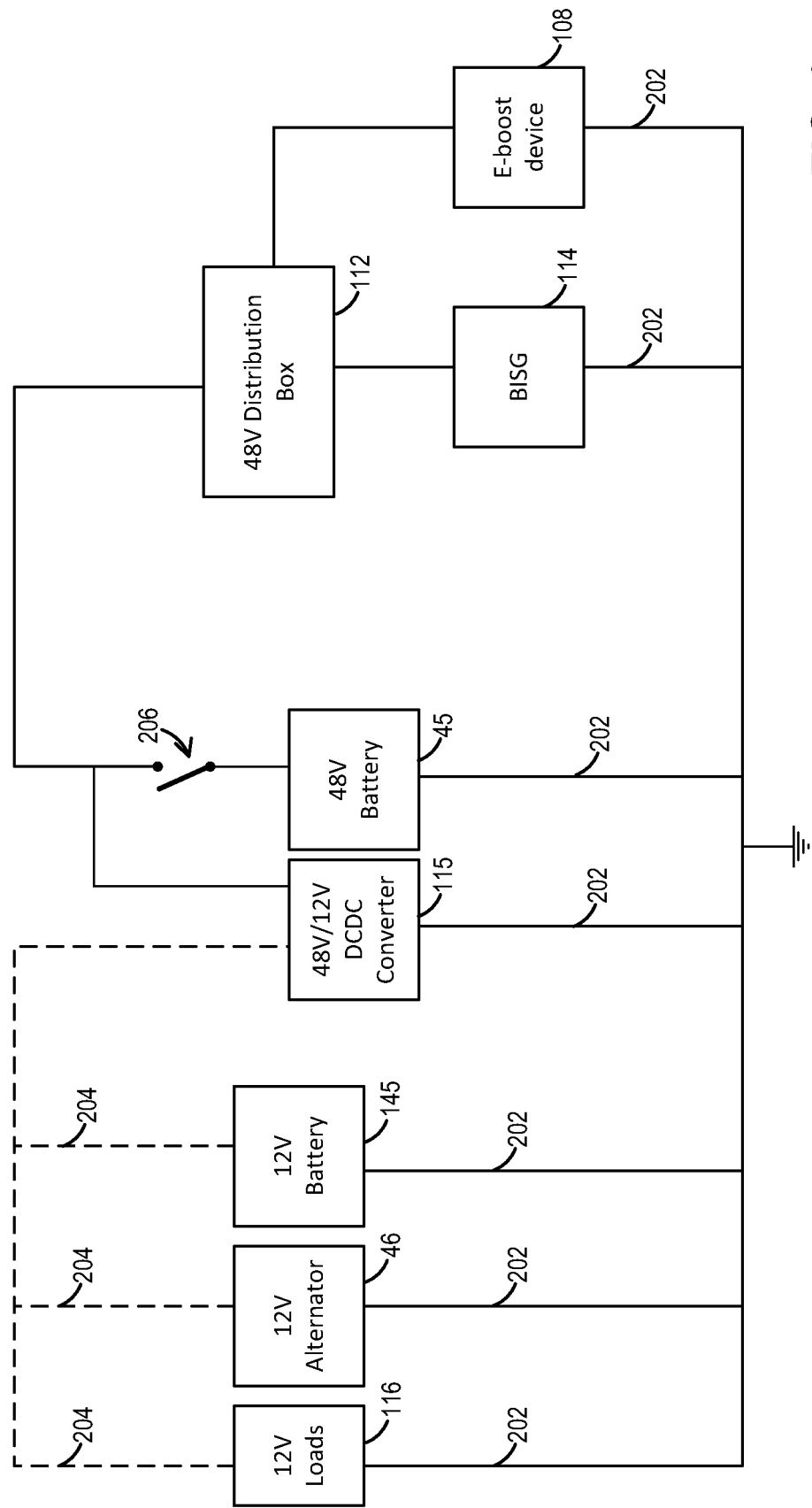
FIG. 2 shows an example electrical coupling of the components of the boosted engine system of FIG. 1.

As elaborated with reference to FIG. 2, the system battery 45a may be coupled to a 48 V branch of the electrical system of the vehicle, such as via 48 V distribution box 112. Further, the system battery 45a may be couplable to 12 V auxiliary loads 116 (including components such as an alternator connected to a 12 V branch of the electrical system of the vehicle) via a 48 V/12 V DCDC converter 115.

In the depicted embodiment, engine 10 is a boosted engine configured with a boosting device, herein shown as turbocharger 15. Turbocharger 15 includes compressor 113 that is mechanically coupled to, and driven by, turbine 116 via a shaft 19, the turbine 116 driven by expanding engine exhaust. In one embodiment, the turbocharger may be a twin scroll device. In another embodiment, the turbocharger may be a variable geometry turbocharger (VGT), wherein turbine geometry is actively varied as a function of engine operating conditions. Turbocharger 15 may be further configured as an electrically assisted turbocharger having an electric motor 108 (herein also referred to as an electric assist motor) configured to provide electric assistance to the compressor, turbine, or turbocharger shaft. In the depicted example the electric motor 108 is coupled to shaft 19 although in other examples, the electric motor may be selectively coupled to the compressor 113 or the turbine 116. Electric motor 108 may be powered by an on-board energy storage device, such as a high voltage (e.g., 48 V) system battery 45b (as shown, or to system battery 45a in an alternate example). Electric motor 108 may be additionally or alternatively powered by alternator 46. An amount of electrical power delivered to electric motor 108 may be varied in order to adjust a duty cycle of the turbocharger. In one example, the amount of electric power delivered to electric motor 108 may be increased to increase the speed of compressor 113. As a result of the electrical assistance, compressor 113 of turbocharger 15 may be rapidly spun up, reducing turbo lag.

It will be appreciated that while the depicted example shows the turbocharger as the boosting device, the turbocharger configured with electric assistance, this is not meant to be limiting. In still further examples, the electric assisted boosting device may include the electric motor coupled to a supercharger compressor. Further still, the engine may be a compound boosted engine system having an electrical supercharger (not shown) coupled upstream or downstream of the turbocharger in the engine intake. Therein, the supercharger may be the boosting device configured to receive electric assistance from electric motor 108 while turbocharger 15 may or may not be configured to receive electric assistance from electric motor 108. By spinning up the electric supercharger via the electric motor, a burst of boost pressure may be rapidly provided to the engine.

Electric motor 108 may be configured as a motor-generator. Thus, during conditions when electric assistance is required for boost build-up, the electric motor may provide positive torque (herein also referred to as motor torque) to drive either the centrifugal compressor of the supercharger, or the turbocharger shaft, to improve the transient boost pressure delivery. However, the electric motor is also capable of energy recuperation by "braking" the motor shaft. Therein, negative torque (herein also referred to as regenerative torque) may be applied to the compressor (or shaft or turbine), reducing the compressor speed and concurrently charging the system battery (such as battery 45b) coupled to the electric motor 108. For example, during conditions when turbocharger over-speeding is anticipated (such as during high boost conditions), a negative torque may be applied to the shaft via the electric motor 108 and the absorbed energy may be used to charge the battery until a threshold state of charge (e.g., 95% SOC) is reached. In still other examples, such as during vehicle deceleration or when there is a decrease in operator torque demand, boosted engine output can be rapidly decreased by braking the turbocharger shaft via the electric motor and recuperating the braking energy as charge stored in a system battery coupled to the electric motor.

Electric motor 108 may be coupled via an inverter 110 to a 48 V distribution box 112. As elaborated with reference to FIG. 2, the 48 V distribution box couples the electric motor to a 48 V branch of the electrical system of the vehicle. The inverter 110 is configured to convert a 48 V DC input received from the 48 V distribution box into a 48 V AC input for use by the electric motor 108, as well as other 48 V electrical power using devices. Electric motor 108 is powered by electrical energy received via the 48 V distribution box 112, such as from system battery 45b. System battery 45b, like battery 45a, may be a 48 V architecture battery. In an alternate example, electric motor 108 may also be coupled to system battery 45a (that is, there may be a single 48 V battery in the engine system, the same battery coupled to both the electric motor of the e-Turbo as well the electric motor of the hybrid driveline). System battery 45a, 45b are each coupled via converter 115 to a 12 V branch of the electrical system of the vehicle. Specifically, converter 115 is a 48 V/12 V converter that is configured to convert the 48 V charge of the 48 V batteries to a 12 V charge for storage in a 12 V system battery 145. Charge from the 12 V battery 146 is then used to power various 12 V accessory loads, such as alternator 46. Other 12 V loads include various system electric heaters such as a windshield wiper heater, a catalyst heater, a cabin heater, and a positive temperature coefficient (PTC) heater. One example of a 48 V more charge sensitive battery includes a lithium ion battery. One example of a 12 V less charge sensitive battery includes a lead acid battery.

As elaborated with reference to FIG. 2, the 48V distribution box may receive electrical power from various sources and likewise, various electrical components may draw electrical power from the distribution box. For example, when electric motor 108 acts a generator (such as during shaft braking), the generated electrical power is delivered to the 48V distribution box from where it may be drawn for charging the 48V system battery, or for operating the BISG to supplement engine torque. As another example, when BISG 114 acts a generator (such as during vehicle wheel braking), the generated electrical power is delivered to the 48V distribution box from where it may be drawn for operating the electric motor 108 (such as to compress air).

Fresh air is introduced along intake passage 42 into engine 10 via air box 112 and flows to compressor 113. Air is then compressed at compressor 113 and introduced into engine 10. Air compressed by turbocharger 15 may also be recirculated from downstream of the compressor 113 and downstream of a charge air cooler 18 to an inlet of compressor 113 through a compressor recirculation passage 60 by adjusting an opening of a continuously variable compressor recirculation valve (CCRV) 62. CCRV 62 may be a continuously variable valve and increasing the opening of the CCRV 62 may include actuating (or energizing) a motor or solenoid to open the valve. In alternate examples, compressor recirculation passage 60 may couple the compressor outlet, upstream of the CAC 18, to the inlet of compressor 113.

CCRV 62 may be a continuously variable valve wherein a position of the valve is continuously variable from a fully closed position to a fully open position. In some embodiments, CCRV 62 may be partially open during boosted engine operation to provide a surge margin. Herein, the partially open position may be a default valve position.

Then, in response to an indication of surge, the opening of CCRV 62 may be increased. For example, CCRV 62 may be adjusted from the default, partially open position toward a fully open position, with a degree of opening based on the indication of surge (e.g., the compressor pressure ratio, the compressor flow rate, a pressure differential across the compressor, etc.). In alternate examples, CCRV 62 may be held closed during boosted engine operation (e.g., peak performance conditions) to decrease boost response time and increase peak performance. As elaborated at FIG. 3, during deceleration conditions when there is excess regenerative braking energy available (specifically, in excess of an amount that can be accepted at the system battery), vehicle speed control can be achieved by recirculating compressed air around the compressor. A controller may increase the opening of CCRV 62 (e.g., to a fully open position) while closing throttle 20 (e.g., to a fully closed position) so as to use the regenerative braking energy to operate the electric boost assist motor, while recirculating the generated compressed air around the compressor via the CCRV. By recirculating the compressed air via operating the electric boost motor, the vehicle speed can be reduced without relying on friction brakes. In addition, at least a portion of the generated compressed air can be stored in a storage tank for later use, such as for reducing turbo lag during a subsequent tip-in. By reducing the need for operating the electric motor during a tip-in, further improvements in fuel economy are obtained.

Compressor 113 is coupled to a throttle valve 20 through a charge-air cooler (CAC) 18 (also referred to as an intercooler herein). Air flows from compressor 113 through CAC 18 and throttle valve 20 to an intake manifold 22. CAC 18 may be an air-to-air or water-to-air heat exchanger, for example. Intake manifold pressure (e.g., a pressure of the air charge within the intake manifold) may be determined using a manifold absolute pressure (MAP) sensor 124.

During selected conditions, a portion of the intake air compressed upon passage through compressor 113 may be redirected for storage to a storage tank 72 by adjusting an opening of air storage valve 74. Storage tank 72 may be coupled to intake passage 42 downstream of CAC 18 and upstream of throttle 20 via bypass 70. One or more valves may regulate the flow of compressed air from the intake manifold, downstream of the compressor and upstream of the throttle, into the compressed air storage tank. The one or more valves may include a check valve 74*c* that ensures unidirectional flow from the intake manifold into the storage tank along a first branch of bypass 70. Valve 74*a*, located upstream of check valve 74*c* (in the direction of flow) may be commanded open by controller 12 while the manifold pressure upstream of the throttle is higher than the pressure in the storage tank (e.g., when boost pressure is higher than demanded) so as to store a portion of the air compressed by compressor 113 in the storage tank. At a later time, such as when the manifold pressure downstream of the compressor and upstream of the throttle is lower than the pressure in the storage tank (e.g., during a tip-in from no boost conditions), control valve 74*b* located in a second branch of the bypass may be opened so as to release some or all of the stored compressed air. In this way, the opening of air storage valves 74*a-b* may be adjusted to regulate the pressure inside of storage tank 72 relative to a throttle inlet pressure (or boost pressure). As elaborated at FIG. 3, during vehicle deceleration conditions where a limited amount of regenerative braking energy is available due to the elevated state of charge of a system battery, additional vehicle braking is provided by applying negative torque on the driveline via the BISG, using the electrical energy generated via the BISG to operate the electric boost motor 108, and storing the generated compressed air in the storage tank for later use. This enables the vehicle to be slowed with reduced need for vehicle friction brake usage, and while harnessing the braking energy as stored compressed air which can be used at a later time, such as for addressing turbo lag or for operating pneumatic devices on-board the vehicle. Compressed air stored in storage tank 70 may be then be used at a later time, or concurrently, for various vehicle functions. For example, compressed air may be used to improve the engine's performance and address turbo lag by providing readily available boost pressure.

Intake manifold 22 is coupled to a series of combustion chambers 30 through a series of intake valves (not shown). The combustion chambers are further coupled to an exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted for the desired combustion and emissions-control performance. For example, the cam timing may be adjusted via a variable cam timing system to move the intake and exhaust cams to a position that provides the optimal volumetric efficiency for the given operating conditions.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the depicted example, fuel is provided to each combustion chamber 30 via direct injection by a fuel injector 66 (while only one fuel injector is shown in FIG. 1, each combustion chamber includes a fuel injector coupled thereto). Fuel may be delivered to fuel injector 66 by a fuel system (not shown) including a fuel tank, a fuel pump, and a fuel rail. In the combustion chambers, combustion may be initiated via spark ignition and/or compression ignition.

As shown in FIG. 1, exhaust from exhaust manifold 36 is directed to turbine 116 to drive the turbine. When reduced turbine torque is desired, a portion of exhaust may be directed instead through a waste-gate 90, bypassing the turbine. A waste-gate actuator 92 (e.g., waste-gate valve) may be actuated open to relieve at least some exhaust pressure from upstream of turbine 116 to a location downstream of turbine 116 via waste-gate 90. By reducing exhaust pressure upstream of turbine 116, turbine speed may be reduced.

The combined flow from turbine 116 and waste-gate 90 flows through an emission control device 170. In general, emission control device 170 may include one or more exhaust after-treatment components configured to reduce an amount of one or more substances in the exhaust flow. For example, one exhaust after-treatment component may be configured to trap NOx from the exhaust flow when the exhaust flow is lean and to reduce the trapped NOx when the exhaust flow is rich. In other examples, an exhaust after-treatment component may be configured to disproportionate NOx or to selectively reduce NOx with the aid of a reducing agent. In still other examples, emission control device 170 includes a three-way catalyst configured to oxidize residual hydrocarbons and carbon monoxide while reducing NOx in the exhaust flow. Different exhaust after-treatment catalysts having any such functionality may be arranged in wash coats or elsewhere in emission control device 170, either separately or together. In some embodiments, the emission control device 170 may further include a regeneratable soot filter configured to trap and oxidize soot particles in the exhaust flow.

All or part of the treated exhaust from emission control device 170 may be released into the atmosphere via an exhaust conduit 35. Depending on operating conditions, however, some exhaust may be diverted instead to intake passage 42 via an exhaust gas recirculation (EGR) passage (not shown), including an EGR cooler and an EGR valve. EGR may be recirculated to the inlet of compressor 113.

One or more sensors may be coupled to the inlet of compressor 113. For example, a temperature sensor 55 may be coupled to the inlet of compressor 113 for estimating a compressor inlet temperature. As another example, a pressure sensor 56 may be coupled to the inlet of compressor 113 for estimating a pressure of air entering the compressor. Still other sensors may include, for example, air-fuel ratio sensors, humidity sensors, etc. In other examples, one or more of the compressor inlet conditions (such as humidity, temperature, pressure, etc.) may be inferred based on engine operating conditions. The sensors may estimate a condition of the intake air received at the compressor inlet from the intake passage as well as the air charge recirculated through passage 60. One or more sensors may also be coupled to intake passage 42 upstream of compressor 113 for determining a composition and condition of air charge entering the compressor. These sensors may include, for example, a pressure sensor 58. In addition, a throttle inlet pressure (TIP) sensor 59 may be coupled downstream of CAC 18 and upstream of throttle valve 20 for estimating a boost pressure delivered to the engine.

During an operator tip-in event, when going from engine operation without boost to engine operation with boost (that is, un-boosted to boosted tip-in) responsive to an increase in operator torque demand, turbo lag can occur. This is due to delays in turbine 116 spin-up due to the turbocharger inertia and reliance on exhaust energy to power the turbine. The same may also occur when the engine is operating boosted and there is a transient increase in boost demand due to an increase in accelerator pedal application by the vehicle operator (that is, boosted to boosted tip-in). To reduce this turbo lag, during those selected conditions, turbocharger 15 may be electrically assisted by receiving positive torque from electric motor 108 (herein also referred to as the e-boost motor). Specifically, responsive to the tip-in, waste-gate actuator 92 may be closed (e.g., fully closed) to increase exhaust flow through turbine 116. Before sufficient turbine power is available to turn the compressor at the speed needed to provide the required boost, the electric motor may increase power to the turbocharger shaft. When the turbine has sufficient pressure and flow from the exhaust gasses and the turbocharger is capable of providing the requested amount of boost, electric assistance to the turbocharger from electric motor 108 may be disabled. Additionally or optionally, while the turbine spools up, manifold pressure may be raised by discharging an amount of compressed air from storage tank 72 by opening air storage valve 74.

Figure 3:
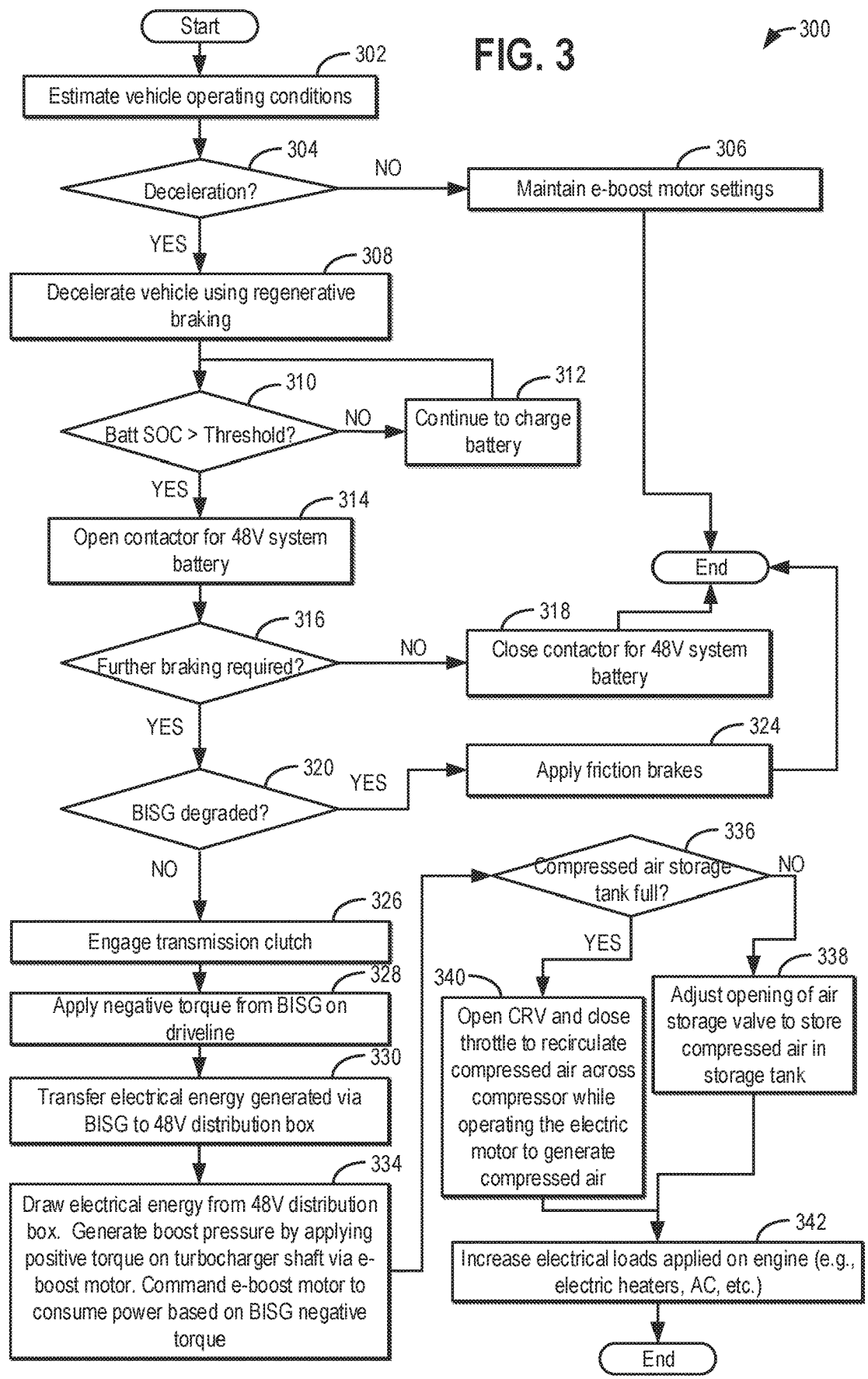
FIG. 3 shows a high level flow chart of a method for using negative torque from BISG to reduce vehicle over-speeding and friction brake usage without overfilling a system battery.

As elaborated with reference to FIG. 3, during a vehicle deceleration event, an engine controller may apply negative torque from BISG 114 on the driveline, via an actuated transmission clutch, to absorb torque from the driveline to recharge system battery 45b. Additionally, the controller may reduce boosted engine output by applying negative torque via the electric motor 108 on the turbocharger shaft 19 to limit turbocharger output, while absorbing the torque to recharge system battery 45b. This may be continued until the battery reaches a threshold SOC (such as when the battery is 95% filled). Thereafter, further vehicle speed control may be enabled by applying negative torque on the vehicle driveline via BISG 114 and using the generated electrical power to operate the electric motor 108 to generate compressed air. This allows the regenerative braking energy to be recuperated via engine components other than the system battery. By proportioning recuperation of braking energy between charging the battery and operating the electric motor, vehicle speed control is achieved with reduced reliance on friction brakes. The negative torque applied by the BISG to decelerate the vehicle is used by the generator component of the BISG to generate electrical energy which is transferred to a high voltage electrical energy distribution box of the vehicle (such as a 48V distribution box elaborated at FIG. 2). This electrical energy can then be used to operate the e-boost motor 108 to generate compressed air, which is stored in the storage tank 72 for later use. This allows the braking energy to be harvested instead of being wasted. If the storage tank 72 is already filled and unable to accept further air charge, the e-boost motor is operated to generate compressed air while the throttle 20 is closed and CCRV 62 is opened to recirculate the compressed air around the compressor. This operation is detailed at FIG. 3.

During an operator tip-out event, when going from engine operation with boost to engine operation without boost (that is, boosted to un-boosted tip-out), compressor surge may occur. This is due to a decreased flow through the compressor 113 when throttle valve 20 closes at the tip-out. The reduced forward flow through the compressor can cause surge and degrade turbocharger performance. In addition, surge can lead to noise, vibration, and harshness (NVH) issues such as undesirable noise from the engine intake system. To enable the torque demand to be rapidly reduced responsive to the tip-out without incurring compressor surge during a default mode of vehicle operation, at least a portion of the air charge compressed by compressor 113 may be recirculated to the compressor inlet. This allows sufficient flow through the compressor to continue while reduced flow is delivered to the intake manifold. In particular, CCRV 62 may be opened to recirculate (cool) compressed air from the outlet of compressor 113, downstream of CAC 18, to the inlet of compressor 113. In addition, waste-gate actuator 92 may be moved to a more open (e.g., fully open) position so that more of the exhaust flow travels to the tailpipe while bypassing the turbine, thereby expediting turbine spin-down.

Controller 12 may be included in a control system 14. Controller 12 is shown receiving information from a plurality of sensors 16 (various examples of which are described herein) and sending control signals to a plurality of actuators 81 (various examples of which are described herein). As one example, sensors 16 may include an exhaust gas sensor 126 located upstream of turbine 116, MAP sensor 124, an exhaust temperature sensor 128, an exhaust pressure sensor 129, compressor inlet temperature sensor 55, compressor inlet pressure sensor 56 (e.g., for measuring Pi), a mass air flow (MAF) sensor 57, pressure sensor 58 and TIP sensor 59. Other sensors, such as additional pressure, temperature, air/fuel ratio, and composition sensors, may be coupled to various locations in vehicle system 100. In addition or in place of the depicted sensors, the controller may infer or model values for pressures, temperatures and/or flow rates based on operating conditions. The actuators 81 may include, for example, throttle valve 20, CCRV 62, electric motor 108, waste-gate actuator 92, BISG 114, and fuel injector 66. Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as example control routines described herein with regard to FIG. 3. As an example, responsive to an operator request for vehicle deceleration, as inferred from pedal position, the controller may send a command signal to a transmission clutch actuator to engage a transmission clutch, and concurrently send a control signal to an actuator of the BISG coupled to the driveline via the transmission clutch, to apply an amount of negative torque on the driveline, and recuperate the braking energy as electrical energy for charging an associated 48V system battery. Then, once the battery is at a threshold charge, the controller may command a contactor coupled to the battery open. The controller may thereafter use the electrical energy generated via the BISG to operate the electric boost assist motor to generate and store compressed air.

Turning now to FIG. 2, an example embodiment of an electrical system 200 that may be coupled to a hybrid vehicle system, such as the vehicle system of FIG. 1, is shown. Components previously introduced are numbered similarly and not reintroduced.

The electrical system includes a low voltage architecture, which is a 12 V architecture in the present example and is depicted herein via long dashed lines 205, and a high voltage architecture, which is a 48 V architecture in the present example and is depicted herein via solid lines 202. Electrical components coupled to the 12 V architecture are configured to receive electrical power at 12 V. These include alternator 46, 12 V system battery 145, and auxiliary 12 V loads 117. Other 12 V components include, but not depicted, include various electrical heaters such as windshield heater, PTC heater, cabin heater, etc. The electrical components coupled to the 12 V architecture are further coupled to the 48 V architecture via the DCDC converter 115 which converts 48 V DC voltage to 12 V DC voltage.

The DCDC converter 115 is coupled to a 48 V battery 45. Thus, the converter 115 converts the electrical power received from system battery 45 for use by the 12 V components including system battery 145. In one example, 12 V system battery 145 is a Lead-acid battery while the 48 V system battery 45 is a Lithium ion battery. Due to the difference in composition, the 48 V battery is more sensitive to overfilling. To avoid overfilling the 48 V battery, a contactor 206 (or switch or relay) is coupled to battery 45, the contactor 206 connecting the battery 45 to a source of 48 V electrical power. When the state of charge (SOC) of battery 45 is below a non-zero threshold, such as below 95% SOC, the contactor is actuated to a closed position, causing the circuit to be closed. This position allows battery 45 to receive charge from a 48 V distribution box 112. Else, when the state of charge (SOC) of battery 45 is above the non-zero threshold, such as above 95% SOC, the contactor is commanded to an open position and the circuit is opened, disabling battery 45 from receiving any further charge.

Distribution box 112 receives electrical power from multiple sources. These sources include motor/generators that can operate as a generator to generate electrical power which is transferred to distribution box 112 for storage in the battery 45. The same motor/generators can also operate as a motor to use electrical power drawn via distribution box 112 from battery 45. For example, electrical power is generated by a belt integrated starter/generator BISG 114 when it converts crankshaft rotation to electrical power (with the BISG operating in a generating mode). Electrical power is also generated by BISG 114 when a negative torque is applied by BISG 114 on a vehicle driveline during a deceleration event (again with the BISG operating in the generating mode). Therein, the applied negative torque causes regenerative braking which generates electrical power at the BISG that is transferred to the distribution box 112. As elaborated at FIG. 3, the electrical power generated by BISG 114 during a vehicle deceleration event can be drawn from the distribution box and applied to electric motor 108. The resulting positive torque applied by electric motor 108 on a control shaft of the engine's turbocharger generates compressed air which can be used or stored in a storage tank for later use. BISG 114 may also draw electrical power to provide torque to the driveline when operating in a motoring mode. As another example, electrical power is generated by electric motor 108 coupled to the electric boosting device, herein the electric turbocharger (or eTurbo), when it converts shaft rotation to electrical power. Electric motor 108 may also draw electrical power from the battery to increase eTurbo output.

In this way, the components of FIGS. 1-2 enable a vehicle system comprising: an engine having an intake and an exhaust; a belt-integrated starter/generator (BISG) coupled to an engine crankshaft; a turbocharger having an intake compressor mechanically coupled to an exhaust turbine via a shaft, and an electric boost assist motor coupled to the shaft; a first bypass with a recirculation valve for recirculating compressed air from a compressor outlet to a compressor inlet; a throttle valve coupled to the engine intake, downstream of the compressor; a second bypass with a storage valve and a compressed air storage tank, the second bypass located downstream of the compressor outlet and upstream of the throttle; an electrical system including a high voltage battery, a low voltage battery, an electric heater, and a distribution box, the high voltage battery electrically coupled to the distribution box via a contactor, the distribution box electrically coupled to each of the BISG and the electric boost assist motor; and a controller with computer readable instructions that when executed cause the controller to: responsive to a higher than threshold vehicle speed, apply negative torque on the driveline via the BISG with the contactor closed and charge the high voltage battery to a threshold state of charge; and then apply negative torque on the driveline via the BISG while applying positive torque on the shaft via the electric boost assist motor with the contactor open and while opening the storage valve to store compressed air in the storage tank. For example, applying positive torque on the shaft via the electric boost assist motor may include transferring electrical power generated by the BISG to the distribution box, and drawing electrical power from the distribution box to spin the shaft via the electric motor with an intake throttle open until the storage tank is filled. Additionally, the controller may include further instructions that cause the controller to: after filling the storage tank, draw additional electrical power from the distribution box to operate the electric heater; and continue to apply positive torque on the shaft via the electric boost assist motor; and open the recirculation valve to recirculate compressed air across the compressor with the intake throttle closed. The controller may include further instructions that cause the controller to: after filling the storage tank, draw additional electrical power from the distribution box to charge the low voltage battery. In one example, the high voltage battery is more charge sensitive and includes a lithium ion battery, and the low voltage battery is less charge sensitive and includes a lead acid battery.

Turning now to FIG. 3, an example method 300 is shown for enabling vehicle speed control without over-charging a charge sensitive system battery. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, the method includes estimating and/or measuring vehicle operating conditions. These include, for example, vehicle speed, driver torque demand, drive brake demand, ambient conditions such as ambient temperature, pressure, and humidity, system battery state of charge (SOC), ratio of wheel torque being provided via engine torque relative to motor torque from an electric motor, etc. Vehicle operating conditions may also include engine operating conditions. These include, for example, engine speed, MAF, MAP, EGR flow, boost pressure, etc.

At 304, it may be determined if there is a deceleration event. In one example, a deceleration event may be confirmed responsive to a vehicle operating braking request, such as may be inferred from actuation of a brake pedal (and/or release of an accelerator pedal) by a vehicle operator. In one example, a braking request may be confirmed when the brake pedal position (or accelerator pedal position) changes by more than 50%. Responsive to the deceleration event, it may be determined that a vehicle speed needs to be reduced. An amount of braking torque required to be applied to vehicle wheels to reduce the vehicle speed is determined as a function of the initial vehicle speed at which the deceleration is requested, as well as a degree of deceleration requested (which may be inferred from a target, reduced vehicle speed, a final position of the brake pedal upon application by the operator, or a final position of the accelerator pedal upon release by the operator). In one example, a larger braking torque is required as the initial vehicle speed from which the vehicle is decelerating increases, and as the brake pedal/accelerator pedal position is changed by a larger amount over the deceleration event.

If a deceleration event is not confirmed, electric boost assist motor settings may be maintained at 306. For example, if the electric boost assist motor was applying positive torque to the turbocharger shaft to meet boost demand, then positive torque application may be continued. As another example, if the electric boost assist motor was not applying torque to the turbocharger shaft, then the motor may be maintained disabled.

If a deceleration event is confirmed, the method moves to 308 to decelerate the vehicle using regenerative braking. Decelerating the vehicle using regenerative braking includes applying negative torque on the vehicle driveline via a motor/generator, and absorbing the torque for generating electrical energy. In one example, where the vehicle is a hybrid vehicle, the regenerative braking torque may be applied via an electric motor coupled to the hybrid vehicle's driveline, such as motor/generator 52. As another example, the regenerative braking torque may be applied via a BISG coupled to the hybrid vehicle's driveline. The amount of negative torque applied by the hybrid motor or BISG on the driveline may be proportional to the vehicle speed reduction required. The generated electrical energy is transferred to a 48V distribution box, and from there the electrical energy is used to charge a system high voltage battery, such as a 48V system lithium ion battery.

As an example, the total amount of negative torque required during the vehicle deceleration event may be determined via a model, look-up table, or algorithm as a function of the operator's braking request (such as based on a degree of depression of the brake pedal). The controller may input the brake pedal depression amount into the look-up table as an input and receive an estimate of the brake torque required as an output.

At 310, the method includes determining if the state of charge of the system high voltage (e.g., 48V) battery is higher than a non-zero threshold. For example, it may be determined if the SOC is higher than 95%. Above the threshold SOC, the battery may not be able to accept additional charge without incurring damage to the battery's performance. In addition, battery life may be affected. Thus, regenerative braking with concurrent battery charging is continued at 312 until the battery is sufficiently charged. If the battery SOC is higher than the threshold, at 314, the method includes opening the contactor for the 48V battery to disable further charging of the battery. For example, the controller may send a command signal to the contactor arm to move it to a position where the electrical circuit coupling the 48V battery to the source of electrical energy via a 48V distribution box is open. As a result, no further charge is received at the battery. Else, if the battery SOC is below the threshold, the controller may maintain the contactor for the 48V battery closed to enable charging of the battery to be continued. For example, the controller may send a command signal to the contactor arm to maintain it in a position where the electrical circuit coupling the 48V battery to the source of electrical energy via the 48V distribution box is closed. At 316, after disabling further charging of the battery, it may be determined if further braking is required. For example, it may be determined if the desired level of vehicle deceleration has been achieved (e.g., if the vehicle speed has been reduced to a target speed based on the braking request). If further braking is not required, such as may occur when the vehicle speed is sufficiently reduced, then at 318, the method includes closing the contactor for the 48V system battery since further charge transfer is not anticipated. The method then exits.

If further braking is required, such as may occur when the vehicle speed is not sufficiently reduced after charging the battery to the threshold SOC, then at 320, the method includes determining if the BISG is degraded. If the BISG is degraded, then at 324, the method includes applying friction brakes for vehicle speed control. For example, friction brakes may be applied to provide a negative wheel torque to provide the required vehicle speed reduction. If the BISG is functional, energy recuperation via the BISG and the electric boost assist motor may be enabled.

It will be appreciated that in further examples, energy recuperation via the BISG and the electric motor may be enabled only upon confirming each of the following conditions: that the BISG is not degraded, that the air storage valve coupling the intake manifold to the storage tank is not degraded, that the compressed air storage tank has a higher than threshold capacity, and the electric boost assist motor temperature is lower than a threshold temperature (such as below 100° C.). If any of the above conditions are not met, such as if the BISG is degraded, if the air storage valve is degraded, if the storage tank is more than threshold full (e.g., more than 99% full), or if the electric boost assist motor temperature is higher than the threshold temperature, then the BISG negative torque application and electric boost assist motor positive torque application may be disabled. Instead, vehicle speed control may be performed via application of friction brakes (at 324).

Brake energy recuperation via the BISG and the electric boost assist motor includes, at 326, engaging a transmission clutch and at 328, applying negative torque from the BISG on the driveline via the engaged transmission clutch. For example, the controller may send a command signal to the driveline transmission to actuate a transmission clutch to an engaged position. By engaging the transmission clutch, a smoother operation of torque absorption at the BISG may be enabled. The transmission clutch may be engaged to select a transmission gear, the gear selected as a function of the vehicle speed. Further, the controller may estimate the amount of power than needs to be recovered to provide the required deceleration. This corresponds to the additional braking energy required to reduce the vehicle wheel speed after applying negative torque via the BISG until the battery is charged.

Applying negative torque from the BISG on the vehicle driveline to decelerate the vehicle includes the controller commanding the BISG to add negative torque to the driveline to reduce vehicle speed, the applied braking torque used by the BISG to generate electrical energy. The BISG negative torque causes vehicle braking while generating electrical power via operation of the BISG in a generating mode. At 330, the method includes transferring the electrical energy generated at the BISG (via the application of negative torque) to a 48V distribution box of the vehicle's electrical architecture.

In this way, by recuperating the brake energy through the driveline by commanding a negative torque to the BISG in proportion to the vehicle braking required, the need for applying friction brakes is reduced. This improves fuel economy and improves brake life.

At 334, the method includes drawing electrical energy from the 48V distribution box and using it to operate the electric motor of the turbocharger. Specifically, electrical power generated by the BISG is used to generate boost pressure by applying positive torque on the turbocharger shaft via operation of the e-boost motor (in a motoring mode). The e-boost motor is commanded to consume power and provide positive torque that is proportionate to the negative torque commanded to the BISG. In particular, the e-boost motor is commanded to consume the same power that the BISG recuperates since the regenerative braking energy cannot be used to charge the system battery. By using the electrical power generated by the BISG while braking the vehicle to run the e-boost motor, the braking energy is harnessed in the form of compressed air instead of being wasted. In addition, friction brake application during vehicle speed control is reduced.

At 336, it may be determined if the compressed air storage tank coupled downstream of the compressor is full (or if it has a higher than threshold amount of compressed air stored inside it). If not, it may be inferred that compressed air can be stored in the tank. Accordingly, at 338, the method includes commanding an air storage valve coupling the intake manifold, downstream of the turbocharger compressor and upstream of the intake throttle, to an air storage tank, to open. An opening of the air storage valve may be adjusted to control the boost pressure. For example, the opening may be adjusted to maintain a pressure outside of the storage tank higher than the pressure inside of the storage tank. The amount of compressed air that is stored in the tank is a function of the tank's storage capacity and a difference between the air pressure inside the tank relative to the throttle inlet pressure (pressure outside the tank). Operating the electric motor and opening the valve to the storage tank allows the recuperated energy to be used for generating and storing compressed air which may be used concurrently or stored for later use. The valve may be held open until the storage tank is full, and then the valve is closed and the method moves to 340. In one example, the compressed air may be used for operating one or more pneumatic devices of the vehicle. These may include, for example, pneumatic tools or for inflating tires. Alternatively, the air may be used for providing "shop air" such as for operating a leaf blower, for inflating balloons, etc. As another example, the stored compressed air may be used to power an air horn, to inflate a pneumatic jack, or to carbonate a bottle of soda. Further, the compressed air may be stored for later use to improve future engine response with readily available boost pressure, such as during turbo lag conditions. Therein, the compressed air may be used to increase boost pressure while a turbine spins up. Alternatively, the air may be used to spool up the turbine, thereby saving electrical power required for operating the e-boost motor. Furthermore, the compressed air could be delivered to one or more engine cylinders during the expansion stroke to run the engine with reduced fueling (e.g., with no fueling). In still further examples, the compressed air may be expanded upon passage through a pipe, thereby creating a vacuum which can be used for one or more vacuum actuated devices, such as vacuum brakes, a vacuum cleaner, or to replace (or assist) an engine vacuum pump. From there the method moves to 342.

If the compressed air storage tank is full (or after the storage tank has been filled to a threshold level), the method moves to 340 to recirculate the generated compressed air. Specifically, while continuing to recuperate the electrical energy from the BISG by operating the e-boost motor, the compressed air is recirculated across the compressor by increasing an opening of the CRV (such as by moving the CCRV to a fully open position) while decreasing the opening of the throttle (such as by moving the throttle to a fully closed position). The recirculation allows the recuperated energy (harnessed via the negative torque of the BISG and the positive torque of the electric boost motor) to be safely sunk without overcharging the system battery.

From each of 340 and 338, the method moves to 342 wherein the method (optionally) further includes increasing the electrical loads applied on the engine. This allows the recuperated braking energy (and corresponding electrical energy) to be consumed via electrical loads instead of being wasted. For example, the controller may increase the auxiliary 12V loads applied on the engine. In addition, the controller may change the power request from the 12 V electrical loads to the DC-DC converter (48 V-12 V converter) to be a function of the difference between the originally requested braking power and the worst case power required to maintain speed control. Increasing the auxiliary loads may include using the electrical energy generated via the BISG to operate one or more electrical heaters, such as a PTC heater, a windshield heater, and a cabin heater. Still other loads may include the controller operating an air conditioning unit of the vehicle to raise or lower a cabin temperature to a setting based on driver demand or history.

In one example, while operating the BISG to apply a negative torque and generate excess electrical energy, the energy may be sunk into the compressed air storage tank (in the form of stored compressed air) or into the auxiliary loads (in the form of drawn current), a ratio of energy sunk into the compressed air storage tank versus the auxiliary loads based on storage tank capacity. For example, when the compressed air storage tank pressure is lower (e.g., when it is empty), a larger portion of the electrical energy may be used to operate the electric motor to generate compressed air which is stored in the tank and a smaller portion of the electrical energy may be used to operate auxiliary heaters. Then, when the compressed air storage tank pressure is higher (e.g., when it is full), a smaller portion of the electrical energy may be used to operate the electric motor to generate compressed air which is recirculated via the CCRV and a larger portion of the electrical energy may be used to operate auxiliary heaters.

Figure 4:
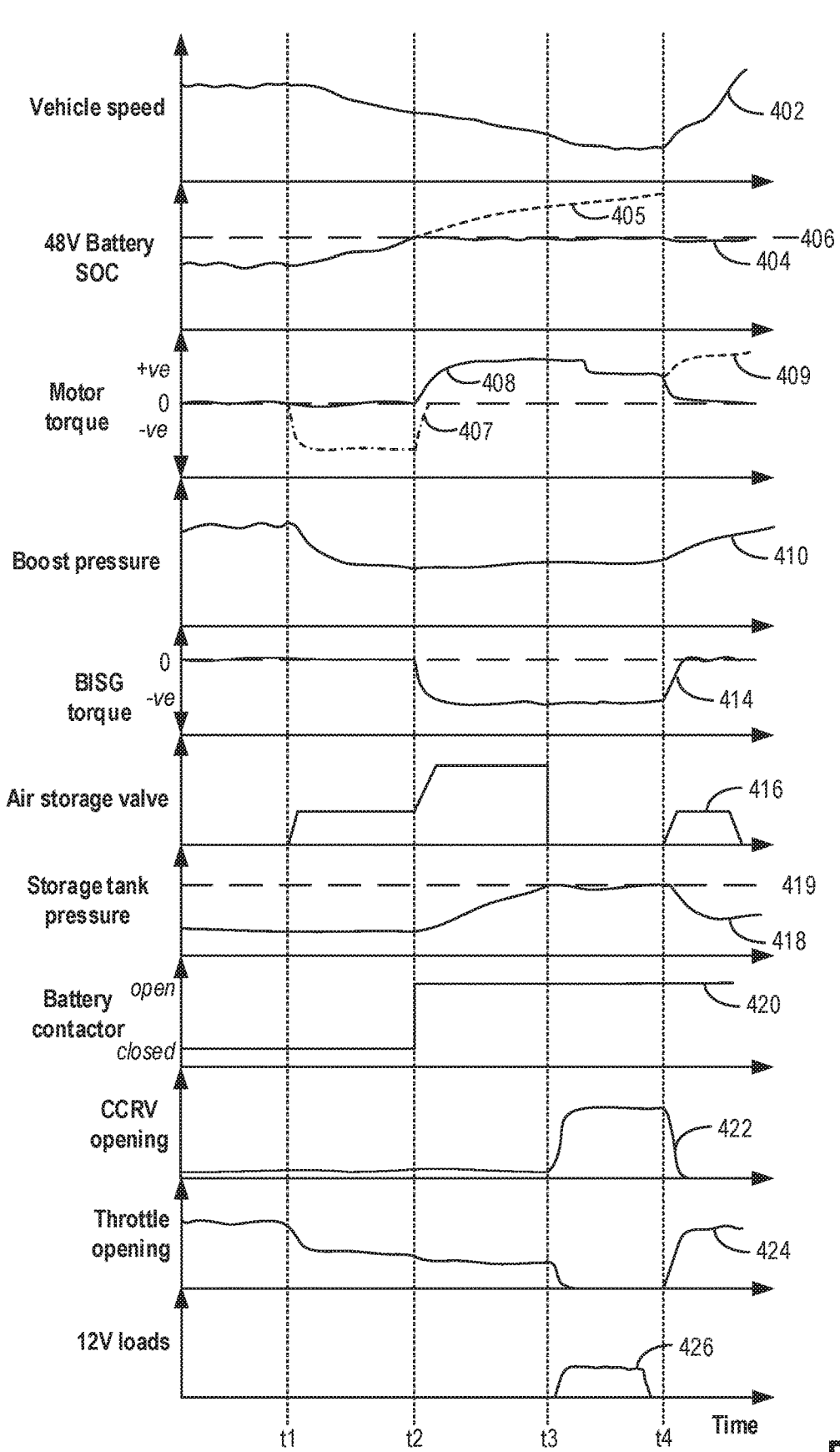
FIG. 4 shows a prophetic example of vehicle speed control via coordinated operation of an electric motor of the electric turbocharger, a BISG, and a compressor recirculation valve.

In this way, by applying negative torque from the BISG during a vehicle braking request based on an amount of charge a system battery can accept, vehicle speed may be controlled while recuperating the regenerative braking energy in the form of compressed air. By adjusting the opening of a compressor recirculation valve while operating the electric motor using electrical energy recuperated by the BISG, the compressed air generated by the electric motor can be recirculated across the compressor, instead of being wasted and instead of being used for overfilling the battery. By adjusting the opening of an air storage valve that redirects compressed air from a compressor to a storage tank, manifold pressure can be controlled based on torque demand, and the energy recuperated in the form of compressed air can be used for boost pressure control (such as during turbo lag). By recuperating the braking energy in the form of compressed air, instead of wasting it, fuel economy is improved. By using previously stored compressed air during turbo lag, not only is braking energy recuperated during the storing of the compressed air, but also the need to draw electrical energy to provide electric boost assist during turbo lag is reduced, further improving fuel economy. Turning now to FIG. 4, an example of vehicle speed control during a braking event via proportioning of negative torque between an electric boost assist motor and a BISG is shown at map 500. The adjustments of FIG. 4 may be enabled by command signals directed to vehicle actuators in accordance with the method of FIG. 3. The method enables vehicle speed control, particularly in situations where a charge sensitive system battery could be potentially overcharged.

Map 400 depicts vehicle speed at plot 402. Plot 404 depicts the state of charge (SOC) of a system battery (specifically a 48V architecture battery coupled to a vehicle driveline) relative to a threshold 406. Above the threshold SOC, battery overfilling may be indicated. Plot 408 depicts a torque output by an electric motor coupled to a turbocharger shaft, the motor configured to provide electric boost assist (and herein also referred to as the e-boost motor). Plot 407 depicts a torque output by an electric motor coupled to a hybrid vehicle driveline, the motor configured to propel the hybrid vehicle during an electric mode or assist mode of vehicle operation. Torque output above the 0 mark is indicative of a positive torque output, which indicates the motor is operating as a motor to provide a positive torque output to spin the turbocharger shaft (in the case of the e-boost motor) or the driveline shaft (in the case of the hybrid motor). When torque output is below the 0 mark, it indicates the motor is operating as a generator to provide a negative torque output, wherein torque from the spinning shaft is used to drive the generator (in the case of the e-boost motor) or from the driveline shaft (in the case of the hybrid motor). Plot 410 indicates a boost pressure (or throttle inlet pressure) estimated at an outlet of an intake compressor of the turbocharger. Plot 414 depicts a BISG torque contribution to the total desired torque. Plot 416 depicts the degree of opening of an air storage valve coupling the intake manifold, downstream of the compressor outlet and upstream of an intake throttle, to an air storage tank. Plot 418 depicts a storage tank pressure, which is indicative of a fill level of the tank. As more compressed air is stored in the tank, the tank pressure increases. As the degree of opening of the valve increases, compressed air may be transferred between the intake manifold and the storage tank, the amount and direction of transfer further determined as a function of the pressure difference between the intake manifold pressure and the storage tank pressure. For example, when the pressure in the storage tank is higher than the manifold pressure, compressed air is released from the storage tank into the intake manifold, such as may be used to improve boost response when the turbine is spooling up. As another example, when the pressure in the storage tank is lower than the manifold pressure, compressed air is stored in the storage tank from the intake manifold, for later use in improving boost response. Plot 420 depicts the state of a contactor switch coupled to the system battery. When the switch is open, an electrical circuit coupling the battery to a 48V distribution box is open disabling charge transfer to/from the battery. When the switch is closed, the electrical circuit coupling the battery to the 48V distribution box is closed enabling charge transfer to/from the battery. Plot 422 depicts the opening of a continuously variable compressor recirculation valve (CCRV) coupled in a bypass across the intake compressor. As the opening of the valve increases, a larger proportion of air compressed by the intake compressor is recirculated from the compressor outlet to the compressor inlet. Plot 424 depicts the opening of an intake throttle.

Prior to t1, the vehicle may be operating at a substantially steady speed (plot 402) with the engine operating boosted (plot 410). The boost pressure may be provided via a turbocharger. At this time, no electric assist is required for boost control, as indicated by no motor torque from the e-boost motor (plot 408) and no change in the SOC of a system battery coupled to the e-boost motor (plot 404). Due to the battery being below threshold SOC 406, a contactor switch coupling the battery to a 48V architecture of the vehicle system is held closed (plot 420). This allows the battery to receive or deliver charge to other electrical components of the vehicle system via a 48V distribution box. At this time, all of the desired torque is provided via engine combustion torque and therefore no BISG torque is required (plot 414). An air storage valve coupling an engine intake manifold downstream of the turbocharger compressor to an air storage tank is held closed (plot 416). As a result, the amount of compressed air in the air storage tank remains constant, and there is no change in the tank pressure (plot 418). No recirculation of compressed air is required, and so the CCRV (plot 422) is held closed (or at a minimal setting based on the boost pressure that improves the compressor's margin to surge). The throttle opening (plot 424) is adjusted based on driver demand.

At t1, an operator braking request is received. For example, there may be an increase in brake demand due to an operator depressing a brake pedal. To provide the requested braking, negative motor torque is applied via an electric motor of the vehicle's hybrid driveline (such as a motor used to propel the vehicle, such as motor/generator 52 of FIG. 1) and regenerative braking is used to decrease the vehicle speed while charging the system battery (plot 407). The amount of negative torque applied is a function of the operator brake demand. The applied negative torque is used between t1 and t2 to charge a system battery coupled to the e-boost motor. Herein the battery is a 48V architecture battery, such as a Li-ion battery.

Also at t1, the boost pressure is further reduced by increasing the opening of the air storage valve so that a portion of the air compressed at the turbocharger is directed to and stored in the air storage tank for later use. Alternatively, the compressed air may be used concurrently to operate a pneumatic device of the vehicle. In the present example, a larger portion of the requested vehicle deceleration and associated drop in boost pressure is provided via the regenerative braking of the electric motor (and the resultant charging of the system battery) while a remaining smaller portion of the requested drop in boost pressure is provided via the storing of compressed air in the storage tank.

At t2, the battery reaches threshold SOC 406. If the battery were to continue receiving charge, as indicated by dashed segment 405, the battery may be overfilled, resulting in performance issues. To avoid overfilling the battery, at t2, a contactor switch coupling the battery to the remaining 48V electrical architecture of the vehicle system is opened (plot 420). This prevents further charge from being received at the battery. In addition, application of negative torque via the e-boost motor is disabled while application of negative torque via a BISG coupled to the vehicle driveline is enabled. Prior to commanding the BISG to apply torque to the driveline, a transmission clutch may be engaged to enable the BISG to absorb the torque.

The BISG may be commanded to apply a negative torque to the driveline that is proportional to the brake torque required to decelerate the vehicle. Both the BISG and the e-boost motor may be coupled to the system battery, and to each other, via the 48V distribution box. By applying negative torque via the BISG, the regenerative braking energy can be sunk without overfilling the system battery. The negative torque applied via the BISG results in the BISG operating as a generator and generating electrical energy that is directed to the distribution box. Since the recuperated electrical energy cannot be used to charge the system battery at this time, instead, the recuperated electrical energy is used to generate compressed air. In particular, while commanding the BISG to apply negative torque, a positive torque is commanded to the e-boost motor that is in proportion to the applied BISG negative torque. The electric motor draws electrical energy from the distribution box and uses it to spin the turbocharger shaft, resulting in an increase in compressed air generation. At the same time, the opening of the air storage valve is further increased so as to store the generated compressed air. The opening of the air storage valve is increased as a function of the motor torque applied by the e-boost motor, or the negative torque applied by the BISG. As a result, the vehicle is decelerated by recuperating regenerative braking energy and harnessing it in the form of compressed air stored in the storage tank. As compressed air is filled in the storage tank, the air pressure in the tank increases, while the boost pressure remains constant.

At t3, the storage tank pressure reaches threshold 419 indicating that it is filled. At this time, no further storage if compressed air is possible. Therefore the air storage valve is commanded closed. However, the vehicle is still not sufficiently decelerated and there is still some regenerative braking energy to recuperate. If not, friction brakes would need to be applied. Thus at t3, the throttle opening is reduced and the CCRV opening is increased so that the compressed air generated via the electric motor can be recirculated across the compressor. This allows the recuperated energy to be sunk via compressed air recirculation, without overcharging the system battery, and without applying vehicle friction brakes. By recuperating most of the energy and not using brakes, fuel economy is increased.

Additionally, one or more auxiliary 12V loads of the vehicle are increased. For example, at least a portion of the electrical energy generated via the BISG can be used to concurrently power an electric heater of the vehicle system. In one example, as shown, the output of the electric motor may be reduced while the output of an electric heater is correspondingly increased, allowing the recuperated energy to be sunk between the electric motor and the electric heater.

At t4, there is a change in vehicle operating conditions, such as a tip-in event, and an increase in vehicle speed is commanded. Responsive to the command, BISG negative torque application is stopped. Also, the air storage valve is commanded open by an amount to release compressed air from the storage tank. The amount of compressed air released is based on the boost demand at the tip-in. By opening the storage valve, the boost pressure can be rapidly increased using the stored compressed air and without needing to supply positive torque from the e-boost motor. This allows for a further improvement in fuel economy.

In this way, by proportioning an amount of torque applied to brake a vehicle between motor torque from an electric motor and torque commanded to a BISG, vehicle speed control can be enabled without overfilling a system battery. By applying a negative wheel braking torque via a BISG after a system battery has been sufficiently charged, the regenerative wheel braking via the BISG can be used to generate electricity which is then recuperated via operation of electric components other than the system battery. For example, the energy may be recuperated as compressed air generated via operation of an electric boost assist motor, and heat from a system heater. By recuperating the braking energy, wastage is reduced, improving fuel economy.

In this way, once a system battery has been sufficiently filled, BISG torque can be leveraged to sink braking energy. The technical effect of commanding a brake torque from a BISG when a battery has reached a threshold state of charge is that overfilling of a charge sensitive system battery, such as a 48V battery of a hybrid vehicle's driveline, can be averted. In particular, the BISG can be used to generate electricity that is disbursed to other electrical components (other than the charged system battery) of a vehicle via a distribution box. By commanding a battery contact to open responsive to a higher than threshold level of charge, overfilling of the battery during conditions when a lot of regenerative braking energy is available is averted. The technical effect of commanding a BISG to apply a torque on the driveline is that braking energy may be recuperated through the vehicle's driveline, instead of through the battery. This allows any excess torque generated after the system battery is charged till a threshold SOC to be used, instead of being wasted. By commanding an electric boost motor to apply a positive torque as a function of the BISG commanded torque after a system battery has been sufficiently charged, the motor torque can be leveraged for filling a compressed air storage tank via operation of a turbocharger compressor. In addition, manifold pressure and engine output may be maintained while the braking energy is recuperated.

One example method comprises: responsive to vehicle deceleration requested while a system battery is at a higher than threshold state of charge, applying negative torque from a belt-integrated starter generator (BISG) on a vehicle driveline while concurrently applying positive torque from an electric motor onto a turbocharger shaft. In the preceding example, additionally or optionally, the electric motor is coupled to the BISG via a distribution box, wherein the battery is coupled to the distribution box via a contactor, the method further comprising, opening the contactor responsive to the system battery being at the higher than threshold state of charge. In any or all of the preceding examples, additionally or optionally, the applied negative torque is proportional to the requested vehicle deceleration, and wherein applying the negative torque includes actuating a transmission clutch, absorbing driveline torque at the BISG to generate electrical power, and transferring the electrical power to the distribution box with the contactor open. In any or all of the preceding examples, additionally or optionally, the positive torque applied from the electric motor is proportional to the negative torque applied from BISG, and wherein applying the positive torque includes drawing the generated electrical power at the electric motor from the distribution box with the contactor open, spinning the electric motor using the generated electrical power, and applying the positive torque on the turbocharger shaft via the spinning electric motor. In any or all of the preceding examples, additionally or optionally, the method further comprises drawing the generated electrical power to operate one or more electrical heaters, the one or more electrical heaters including a windshield heater, a cabin heater, and a PTC heater. In any or all of the preceding examples, additionally or optionally, the system battery is a 48V lithium ion battery, the distribution box is a 48V distribution box, and the one or more electrical heaters are powered via a 12V lead acid battery coupled to the 48V distribution box via a DC-DC converter. In any or all of the preceding examples, additionally or optionally, the method further comprises, while applying positive torque from the electric motor, increasing an opening of a storage valve coupling an engine intake manifold, downstream of a compressor of a turbocharger and upstream of an intake throttle, to an air storage tank, and storing air compressed by an intake compressor of the turbocharger in the air storage tank. In any or all of the preceding examples, additionally or optionally, the method further comprises storing the compressed air in the air storage tank until a capacity of the air storage tank is higher than a threshold, and then closing the storage valve while recirculating the compressed air across the intake compressor. In any or all of the preceding examples, additionally or optionally, recirculating the compressed air includes opening a compressor recirculation valve coupled across the intake compressor while closing the intake throttle.

Another example method comprises: during a deceleration event, applying brake torque on a vehicle driveline via a belt integrated starter-generator (BISG); first charging a battery to a threshold state of charge with a portion of the applied brake torque; and then spinning a turbocharger shaft via an electric motor with a remaining portion of the applied brake torque, at least a portion of air compressed by the spinning turbocharger shaft stored in a storage tank. In the preceding example, additionally or optionally, the electric motor is coupled to the BISG via an electrical power distribution box, and wherein applying brake torque includes generating electrical power via the BISG while decelerating the vehicle, the generated electrical power stored in the electrical power distribution box, and wherein each of the charging the battery and spinning the turbocharger shaft via the electric motor includes drawing electrical power from the electrical power distribution box. In any or all of the preceding examples, additionally or optionally, the battery is electrically coupled to each of the electric motor, the BISG, and the distribution box via a switch, the method further comprising closing the switch responsive to the battery being charged to the threshold state of charge. In any or all of the preceding examples, additionally or optionally, the method further comprises storing the at least a portion of air compressed by the spinning turbocharger shaft in the storage tank until a threshold tank pressure is reached, and then recirculating the compressed air across an intake compressor of the turbocharger with an intake throttle closed. In any or all of the preceding examples, additionally or optionally, the method further comprises operating one or more auxiliary electric heaters using the generated electrical power, the one or more auxiliary electric heaters including a windshield heater, a cabin heater, and a PTC heater. In any or all of the preceding examples, additionally or optionally, the BISG is coupled to the driveline via a transmission, and wherein applying brake torque on the vehicle driveline via the BISG includes engaging a transmission clutch.

Another example vehicle system comprises: an engine having an intake and an exhaust; a belt-integrated starter/generator (BISG) coupled to an engine crankshaft; a turbocharger having an intake compressor mechanically coupled to an exhaust turbine via a shaft, and an electric boost assist motor coupled to the shaft; a first bypass with a recirculation valve for recirculating compressed air from a compressor outlet to a compressor inlet; a throttle valve coupled to the engine intake, downstream of the compressor; a second bypass with a storage valve and a compressed air storage tank, the second bypass located downstream of the compressor outlet and upstream of the throttle; an electrical system including a high voltage battery, a low voltage battery, an electric heater, and a distribution box, the high voltage battery electrically coupled to the distribution box via a contactor, the distribution box electrically coupled to each of the BISG and the electric boost assist motor; and a controller with computer readable instructions that when executed cause the controller to: responsive to a higher than threshold vehicle speed, apply negative torque on the driveline via the BISG with the contactor closed and charge the high voltage battery to a threshold state of charge; and then apply negative torque on the driveline via the BISG while applying positive torque on the shaft via the electric boost assist motor with the contactor open and while opening the storage valve to store compressed air in the storage tank. In the preceding example, additionally or optionally, applying positive torque on the shaft via the electric boost assist motor includes transferring electrical power generated by the BISG to the distribution box, and drawing electrical power from the distribution box to spin the shaft via the electric motor with an intake throttle open until the storage tank is filled. In any or all of the preceding examples, additionally or optionally, the controller includes further instructions that cause the controller to: after filling the storage tank, draw additional electrical power from the distribution box to operate the electric heater; and continue to apply positive torque on the shaft via the electric boost assist motor; and open the recirculation valve to recirculate compressed air across the compressor with the intake throttle closed. In any or all of the preceding examples, additionally or optionally, the controller includes further instructions that cause the controller to: after filling the storage tank, draw additional electrical power from the distribution box to charge the low voltage battery. In any or all of the preceding examples, additionally or optionally, the high voltage battery is more charge sensitive and includes a lithium ion battery, and wherein the low voltage battery is less charge sensitive and includes a lead acid battery. In a further representation, the vehicle system is a hybrid electric vehicle system. In yet another further representation, the vehicle system is an autonomous vehicle system configured with autonomous driving capabilities.

In another further representation, a method for a vehicle with a boosted engine includes: decelerating the vehicle by applying negative torque from a belt integrated starter/generator on a driveline while charging a system battery to a threshold state of charge; and then further decelerating the vehicle by applying negative torque from the belt integrated starter/generator (BISG) while applying positive torque from the electric assist motor. In the preceding example, additionally or optionally, the positive torque applied from the electric assist motor includes using electrical power generated due to application of the negative torque from the BISG, the electric assist motor configured to receive the electrical power via a distribution box electrically coupled to each of the electric assist motor and the BISG. In any or all of the preceding examples, additionally or optionally, the decelerating includes not applying friction brakes of the vehicle.

In yet another representation, a method for a hybrid vehicle comprises, responsive to an operator braking request, decelerating the vehicle via negative motor torque applied via an electric propulsion motor/generator coupled to the driveline until a battery state of charge is higher than a threshold, the electric propulsion motor/generator propelling vehicle wheels during an electric mode of hybrid vehicle operation, and then decelerating the vehicle via negative motor torque applied via a belt-integrated starter/generator coupled to the driveline. In the preceding example, additionally or optionally, decelerating the vehicle via negative motor torque applied via the electric propulsion motor/generator coupled to the driveline includes decelerating the vehicle using regenerative braking wherein a regenerative brake torque is applied via the electric propulsion motor/generator on vehicle wheels. In any or all of the preceding examples, additionally or optionally, decelerating the vehicle via negative motor torque applied via the belt-integrated starter/generator coupled to the driveline includes not applying negative motor torque from the electric propulsion motor/generator on the driveline.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
responsive to vehicle deceleration requested while a system battery is at a higher than threshold state of charge,
applying negative torque from a belt-integrated starter generator (BISG) on a vehicle driveline while concurrently applying positive torque from an electric motor onto a turbocharger shaft; and
opening a contactor, wherein the contactor couples the battery to a distribution box and the distribution box couples the electric motor to the BISG.

2. The method of claim 1, wherein the applied negative torque is proportional to the requested vehicle deceleration, and wherein applying the negative torque includes actuating a transmission clutch, absorbing driveline torque at the BISG to generate electrical power, and transferring the electrical power to the distribution box with the contactor open.

3. The method of claim 2, wherein the positive torque applied from the electric motor on to the turbocharger shaft is proportional to the negative torque applied from BISG, and wherein applying the positive torque includes drawing the generated electrical power at the electric motor from the distribution box with the contactor open, spinning the electric motor using the generated electrical power, and applying the positive torque on the turbocharger shaft via the spinning electric motor.

4. The method of claim 3, further comprising, drawing the generated electrical power to operate one or more electrical heaters, the one or more electrical heaters including a windshield heater, a cabin heater, and a PTC heater.

5. The method of claim 4, wherein the system battery is a 48 V lithium ion battery, the distribution box is a 48 V distribution box, and the one or more electrical heaters are powered via a 12 V lead acid battery coupled to the 48 V distribution box via a DC-DC converter.

6. The method of claim 1, further comprising, while applying positive torque from the electric motor onto the turbocharger shaft, increasing an opening of a storage valve coupling an engine intake manifold, downstream of a compressor of a turbocharger and upstream of an intake throttle, to an air storage tank, and storing air compressed by an intake compressor of the turbocharger in the air storage tank.

7. The method of claim 6, further comprising, storing the compressed air in the air storage tank until a capacity of the air storage tank is higher than a threshold, and then closing the storage valve while recirculating the compressed air across the intake compressor.

8. The method of claim 7, wherein recirculating the compressed air includes opening a compressor recirculation valve coupled across the intake compressor while closing the intake throttle.

9. A method, comprising:
during a deceleration event,
applying brake torque on a vehicle driveline via a belt integrated starter-generator (BISG);
first charging a battery to a threshold state of charge with a portion of the applied brake torque; and
then spinning a turbocharger shaft via an electric motor with a remaining portion of the applied brake torque, at least a portion of air compressed by the spinning turbocharger shaft stored in a storage tank.

10. The method of claim 9, wherein the electric motor is coupled to the BISG via an electrical power distribution box, and wherein applying brake torque includes generating electrical power via the BISG while decelerating the vehicle, the generated electrical power stored in the electrical power distribution box, and wherein each of the charging the battery and spinning the turbocharger shaft via the electric motor includes drawing electrical power from the electrical power distribution box.

11. The method of claim 9, wherein the battery is electrically coupled to each of the electric motor, the BISG, and the distribution box via a switch, the method further comprising closing the switch responsive to the battery being charged to the threshold state of charge.

12. The method of claim 9, further comprising, storing the at least a portion of air compressed by the spinning turbocharger shaft in the storage tank until a threshold tank pressure is reached, and then recirculating the compressed air across an intake compressor of the turbocharger with an intake throttle closed.

13. The method of claim 10, further comprising, operating one or more auxiliary electric heaters using the generated electrical power, the one or more auxiliary electric heaters including a windshield heater, a cabin heater, and a PTC heater.

14. The method of claim 9, wherein the BISG is coupled to the driveline via a transmission, and wherein applying brake torque on the vehicle driveline via the BISG includes engaging a transmission clutch.

15. A vehicle system, comprising:
an engine having an intake and an exhaust;
a belt-integrated starter/generator (BIS G) coupled to an engine crankshaft;
a turbocharger having an intake compressor mechanically coupled to an exhaust turbine via a shaft, and an electric boost assist motor coupled to the shaft;
a first bypass with a recirculation valve for recirculating compressed air from a compressor outlet to a compressor inlet;
a throttle valve coupled to the engine intake, downstream of the compressor;
a second bypass with a storage valve and a compressed air storage tank, the second bypass located downstream of the compressor outlet and upstream of the throttle;
an electrical system including a high voltage battery, a low voltage battery, an electric heater, and a distribution box, the high voltage battery electrically coupled to the distribution box via a contactor, the distribution box electrically coupled to each of the BISG and the electric boost assist motor; and
a controller with computer readable instructions that when executed cause the controller to:
responsive to a higher than threshold vehicle speed,
apply negative torque on the driveline via the BISG with the contactor closed and charge the high voltage battery to a threshold state of charge; and
then apply negative torque on the driveline via the BISG while applying positive torque on the shaft via the electric boost assist motor with the contactor open and while opening the storage valve to store compressed air in the storage tank.

16. The system of claim 15, wherein applying positive torque on the shaft via the electric boost assist motor includes transferring electrical power generated by the BISG to the distribution box, and drawing electrical power from the distribution box to spin the shaft via the electric motor with an intake throttle open until the storage tank is filled.

17. The system of claim 16, wherein the controller includes further instructions that cause the controller to:
after filling the storage tank, draw additional electrical power from the distribution box to operate the electric heater; and
continue to apply positive torque on the shaft via the electric boost assist motor; and
open the recirculation valve to recirculate compressed air across the compressor with the intake throttle closed.

18. The system of claim 16, wherein the controller includes further instructions that cause the controller to:
after filling the storage tank, draw additional electrical power from the distribution box to charge the low voltage battery.

19. The system of claim 15, wherein the high voltage battery is more charge sensitive and includes a lithium ion battery, and wherein the low voltage battery is less charge sensitive and includes a lead acid battery.

* * * * *